(12) United States Patent
Hsieh

(10) Patent No.: US 7,822,107 B2
(45) Date of Patent: Oct. 26, 2010

(54) SPREAD SPECTRUM RECEIVER AND CHANNEL COMPENSATION METHOD THEREOF

(75) Inventor: Chung-Hsien Hsieh, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 673 days.

(21) Appl. No.: 11/684,038

(22) Filed: Mar. 9, 2007

(65) Prior Publication Data

US 2007/0242732 A1    Oct. 18, 2007

Related U.S. Application Data

(60) Provisional application No. 60/785,909, filed on Mar. 24, 2006.

(30) Foreign Application Priority Data

Aug. 29, 2006    (EP) .................................. 06017993

(51) Int. Cl.
*H04B 1/00* (2006.01)
(52) U.S. Cl. ...................................................... 375/148
(58) Field of Classification Search ................. 375/130, 375/147, 148, 150, 152, 260, 267, 144, 326, 375/332, 348; 370/320, 335, 342, 412, 235; 455/272, 296, 306, 134
See application file for complete search history.

(56) References Cited

U.S. PATENT DOCUMENTS 6,430,214 B1    8/2002    Jalloul et al.

| | | | |
|---|---|---|---|
| 6,493,376 B1* | 12/2002 | Harms et al. ................. 375/130 |
| 7,376,210 B2* | 5/2008 | Kim et al. .................... 375/350 |
| 2002/0021749 A1 | 2/2002 | Lee et al. |
| 2003/0072277 A1* | 4/2003 | Subrahmanya et al. ....... 370/320 |
| 2004/0184428 A1* | 9/2004 | Im ............................... 370/342 |
| 2004/0223540 A1* | 11/2004 | Shan .......................... 375/150 |
| 2004/0248541 A1* | 12/2004 | Park ........................... 455/306 |
| 2005/0036537 A1 | 2/2005 | Zancho et al. |
| 2007/0071022 A1* | 3/2007 | Pan et al. .................... 370/412 |

OTHER PUBLICATIONS

EP Search Report mailed Mar. 1, 2007.
EPO Search Report mailed Jan. 12, 2007.

* cited by examiner

*Primary Examiner*—David C Payne
*Assistant Examiner*—Syed Haider
(74) *Attorney, Agent, or Firm*—Thomas, Kayden, Horstemeyer & Risley

(57) ABSTRACT

A spread spectrum receiver in a communication system compensating channel response, and the method thereof is disclosed. The spread spectrum receiver comprises a multiplier, a filter, a data channel correlator, a delay, and a channel compensator. The multiplier (322) multiplies despread pilots (320) with conjugate of pilot pattern (324) to provide channel estimates. The filter (323) filters the channel estimates from the multiplier (322). The data channel correlator (30) despreads data symbols in a data channel. The delay module (38), coupled to the data channel correlator (30), delays the despread data symbols for a period. The channel compensator (34), coupled to the filter (323) and the delay module (38), compensates the delayed despread data symbols with the filtered channel estimates.

14 Claims, 6 Drawing Sheets

SPREAD SPECTRUM RECEIVER AND CHANNEL COMPENSATION METHOD THEREOF

CROSS-REFERENCE TO RELATED APPLICATION

This application claims the benefit of U.S. provisional application Ser. No. 60/785,909 filed Mar. 24, 2006, which is incorporated herein by reference. This application also claims the benefit of European application No. 06017993.4 filed Aug. 29, 2006, the subject matter of which is incorporated herein by reference.

BACKGROUND OF THE INVENTION

1. Field of the Invention

The invention relates to channel estimation, and in particular to channel estimation in a spread spectrum receiver.

2. Description of the Related Art

A spread spectrum system combats multipath interference by multiplying narrowband data by a wideband pseudo noise (PN) code in a spread spectrum transmitter to produce a wideband transmitted signal with nearly the spectrum of the PN code. Examples of spread spectrum systems can be found in Code Division Multiple Access (CDMA) and Wideband CDMA (WCDMA) systems conforming to the UMTS/IMT-2000 (Universal Mobile Telecommunications System/International Mobile Telecommunications-2000) specifications. Typically, spread spectrum systems such as WCDMA systems employ an orthogonal spreading code spreading a data symbol over a desirable spectrum and pseudo noise (PN) scrambling codes separating different cells in downlink transmission and user in uplink transmission. The spreading codes, also known as orthogonal channelization codes, transform a data symbol into a number of chips as the spread-spectrum signal prior to data transmission. Spread spectrum receivers such as RAKE receivers, frequently used in CDMA systems, descramble, and/or despread the received spread spectrum, reducing signal multipath reception to improve reception quality. Spreading and despreading codes may be Gold codes, Walsh codes, orthogonal variable spreading factor (OVSF) channelization codes and/or equivalent code sequences.

A pilot channel is typically used for channel estimation to control various parameters of a received spread spectrum signal at reception, compensating various channel conditions in a particular transmission channel. In wireless communications, channel conditions vary over both time and frequency, thus wireless communications systems, such as spread spectrum communication systems, must estimate and compensate for varying channel conditions to the received spread spectrum signal. In WCDMA downlink transmission, the pilot channel is referred to as common pilot channel (CPICH). Since pilot symbols in CPICH are transmitted with a higher power then other dedicated traffic channels, the result is a better reception, whereby the channel condition can be accurately estimated.

There is a need for a spread spectrum receiver and a method thereof accurately estimating channel conditions for spread spectrum signals.

BRIEF SUMMARY OF THE INVENTION

A detailed description is given in the following embodiments with reference to the accompanying drawings.

According to an embodiment of the invention, a channel compensation method for uses in a spread spectrum receiver (3) for receiving a pilot channel and a data channel is disclosed, comprising despreading pilots (602) from the pilot channel, multiplying (603) despread pilots with conjugate of pilot pattern to provide channel estimates, filtering (604) the channel estimates, despreading (606) data in the data channel, delaying (608) the despread data for a period corresponding to the filtering, and compensating (610) the delayed data with the filtered channel estimates.

According to another embodiment of the invention, a spread spectrum receiver (3) in a communication system compensating channel response is disclosed, comprising a multiplier, a filter, a data channel correlator, a delay, and a channel compensator. The multiplier (322) multiplies despread pilots (320) with conjugate of pilot pattern (324) to provide channel estimates. The filter (323) filters the channel estimates from the multiplier (322). The data channel correlator (30) despreads data symbols in a data channel. The delay module (38), coupled to the data channel correlator (30), delays the despread data symbols for a period. The channel compensator (34), coupled to the filter (323) and the delay module (38), compensates the delayed despread data symbols with the filtered channel estimates.

In the embodiments, the period could be proportional to the group delay corresponding to the filter as well as the filtering. The period could be also proportional to a ratio of spreading factors of the pilot channel to the data channel.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Scope of the invention may include, but is not limited to, Code Division Multiple Access (CDMA), TD-S-CDMA, CDMA-2000 and wideband CDMA (WCDMA) cellular radio telephone receivers receiving spread spectrum signals.

Figure 1:
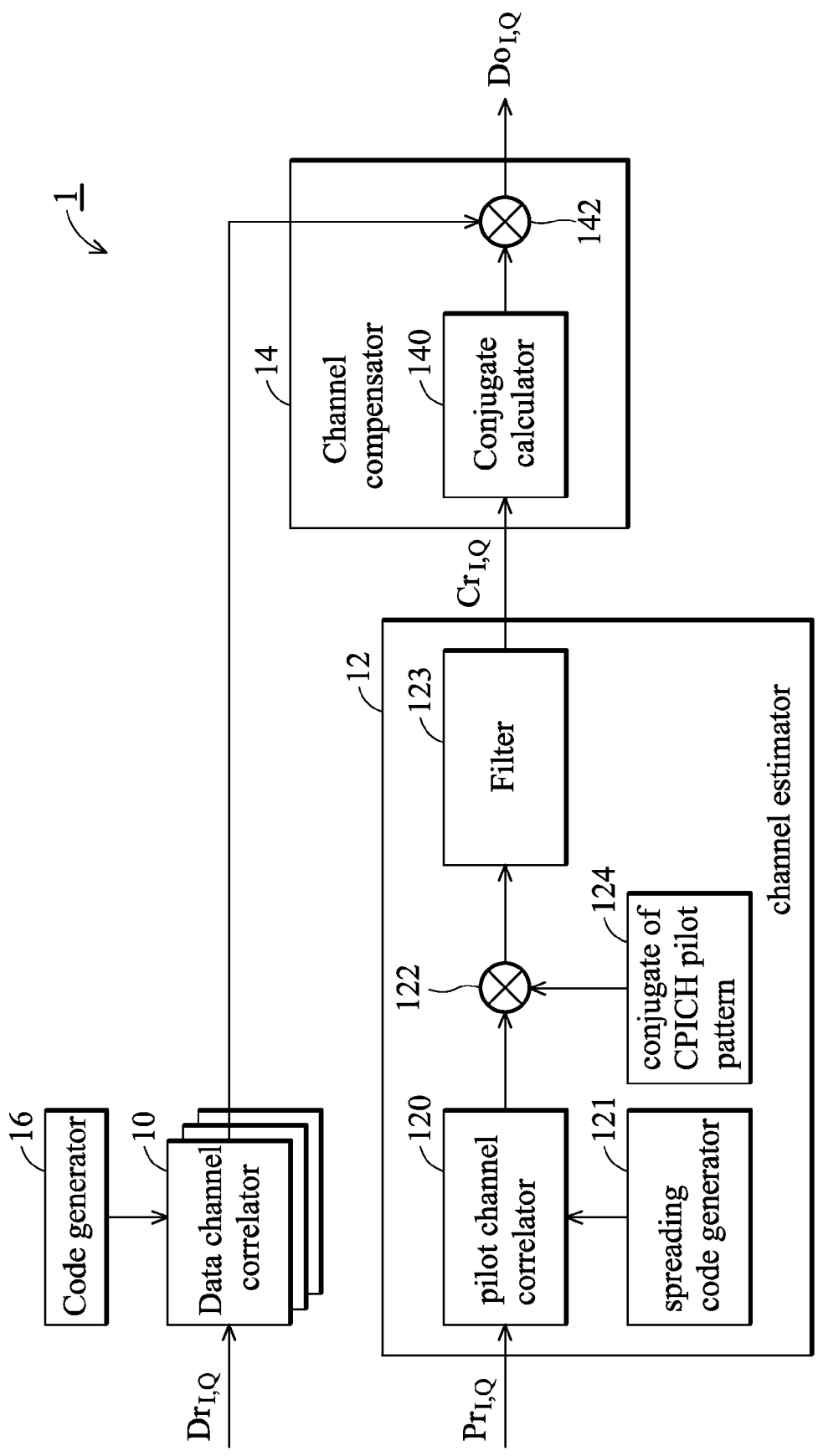
FIG. 1 is a block diagram of a part of a conventional spread spectrum receiver.

FIG. 1 is a block diagram of a part of a conventional spread spectrum receiver 1, comprising data channel correlator 10, channel estimator 12, channel compensator 14, and code generator 16. Code generator 16 is coupled to data channel correlator 10, in conjunction with channel estimator 12 couples to channel compensator 14. Channel estimator 12 comprises pilot channel correlator 120, multiplier 122, filter 123, spreading code generator 121 and conjugate pilot pattern generator 124. Pilot channel correlator 120 is coupled to spreading code generator 121 and multiplier 122. In the WCDMA environment, the pilot channel may refer to a Common Pilot Channel (CPICH) and the pilot pattern generator 124 generates specified CPICH pilot pattern. Ordinary in the skilled would understand that the pilot channel is not confined and restricted as the CPICH. It also means the characteristics, such as spreading factor, of pilot signal are not confined with the CPICH of WCDMA standard in this disclosure.

In one embodiment, spread spectrum receiver 1 is a WCDMA receiver, including several data channel correlators 10 correlating data $Dr_{I,Q}$ transmitted over corresponding downlink physical channels (DPCH), and pilot channel correlator 120 correlating pilot $Pr_{I,Q}$ in a common pilot channel (CPICH). Each data channel correlator 10 despreads and/or descrambles data $Dr_{I,Q}$ with a different despreading code generated by code generator 16. Pilot channel correlator 120 despreads and/or descrambles pilot $Pr_{I,Q}$ with a known spreading code sequence. Pilot $Pr_{I,Q}$ has a constant spreading factor of 256 and a spreading code of all ones, and the CPICH pilot pattern is (1+j). Pilot $Pr_{I,Q}$ are used in spread spectrum receiver 1 for channel estimation. Multiplying the despread pilots by the conjugate of CPICH pilot pattern (1−j) generates channel estimate, for estimating noisy channel due to the presence of Additive White Gaussian Noise (AWGN) and interferences. Filter 123 receives and reduces noise in channel estimate $Pr_{I,Q}$. Filtered channel estimate $Cr_{I,Q}$ is then delivered to channel compensator 14 to be multiplied by correlated data $Dr_{I,Q}$ to generate a channel compensated output data $Do_{I,Q}$. Code generators 16 and 121 may comprise Linear Feedback Shift Registers (LFSR) compliant with standards defined in 3GPP.

However, when conventional channel compensator 14 obtains filtered channel estimate $Pr_{I,Q}$ and correlated data $Dr_{I,Q}$, to perform channel compensation, a finite group delay $D_g$ is found in filtered channel estimate $Pr_{I,Q}$ owning to filter 123, in comparison to correlated data $Dr_{I,Q}$. Consequently channel compensator 14 performs channel compensation for correlated data $Dr_{I,Q}$ with delayed channel estimate $Pr_{I,Q}$.

Figure 2:
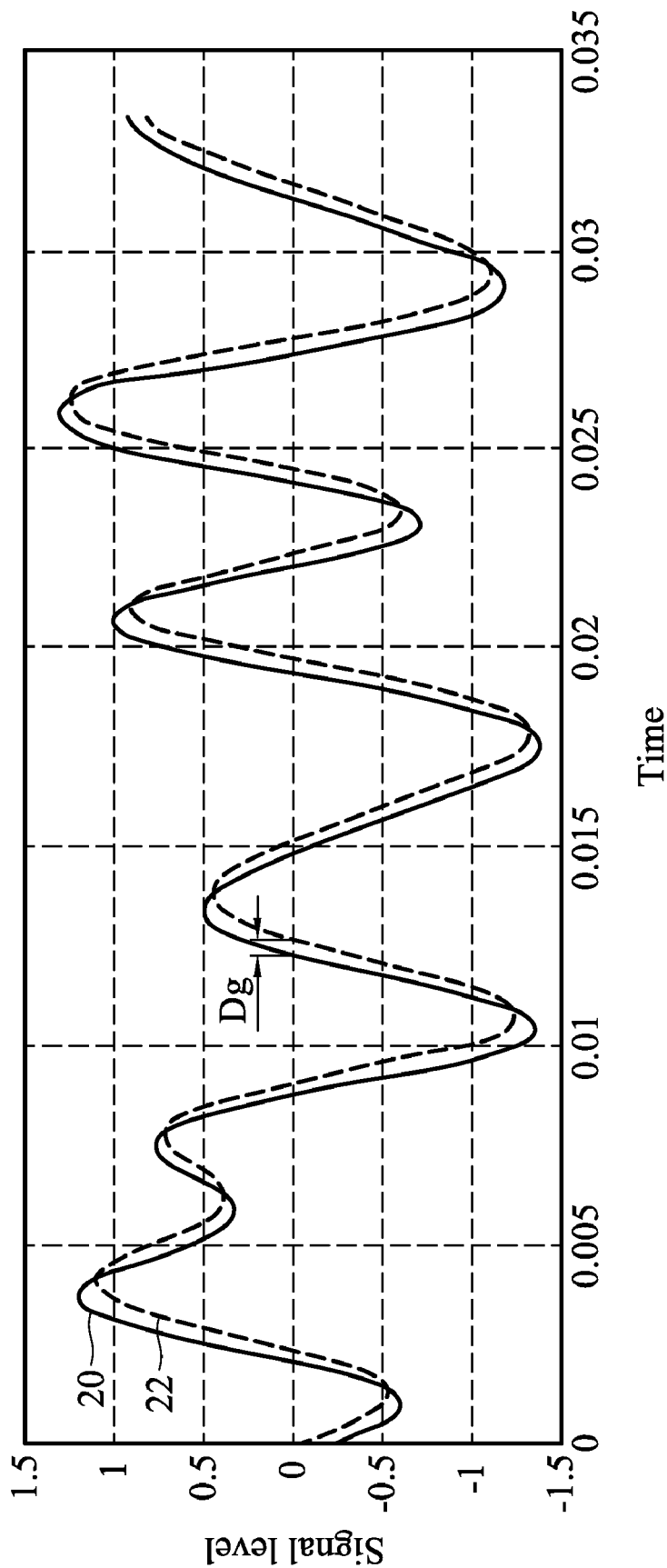
FIG. 2 channel signal level against time incorporating the spread spectrum receiver in FIG. 1.

FIG. 2 plots signal level against time, incorporating the spread spectrum receiver in FIG. 1, comprising real channel 20 and filtered channel estimate 22. Channel estimate passes filter 123 to remove undesirable noise and interferences and generate filtered channel estimate 22. Group delay $D_g$ is observed between real channel 20 and filtered channel estimate 22. Since correlated data $Dr_{I,Q}$ is concurrent with real channel 20, a time difference occurs between correlated data $Dr_{I,Q}$ and filtered channel estimate 22, such that channel compensator 14 performs channel compensation on correlated data $Dr_{I,Q}$ with delayed channel estimate 22, leading to inaccurate channel compensation.

Figure 3:
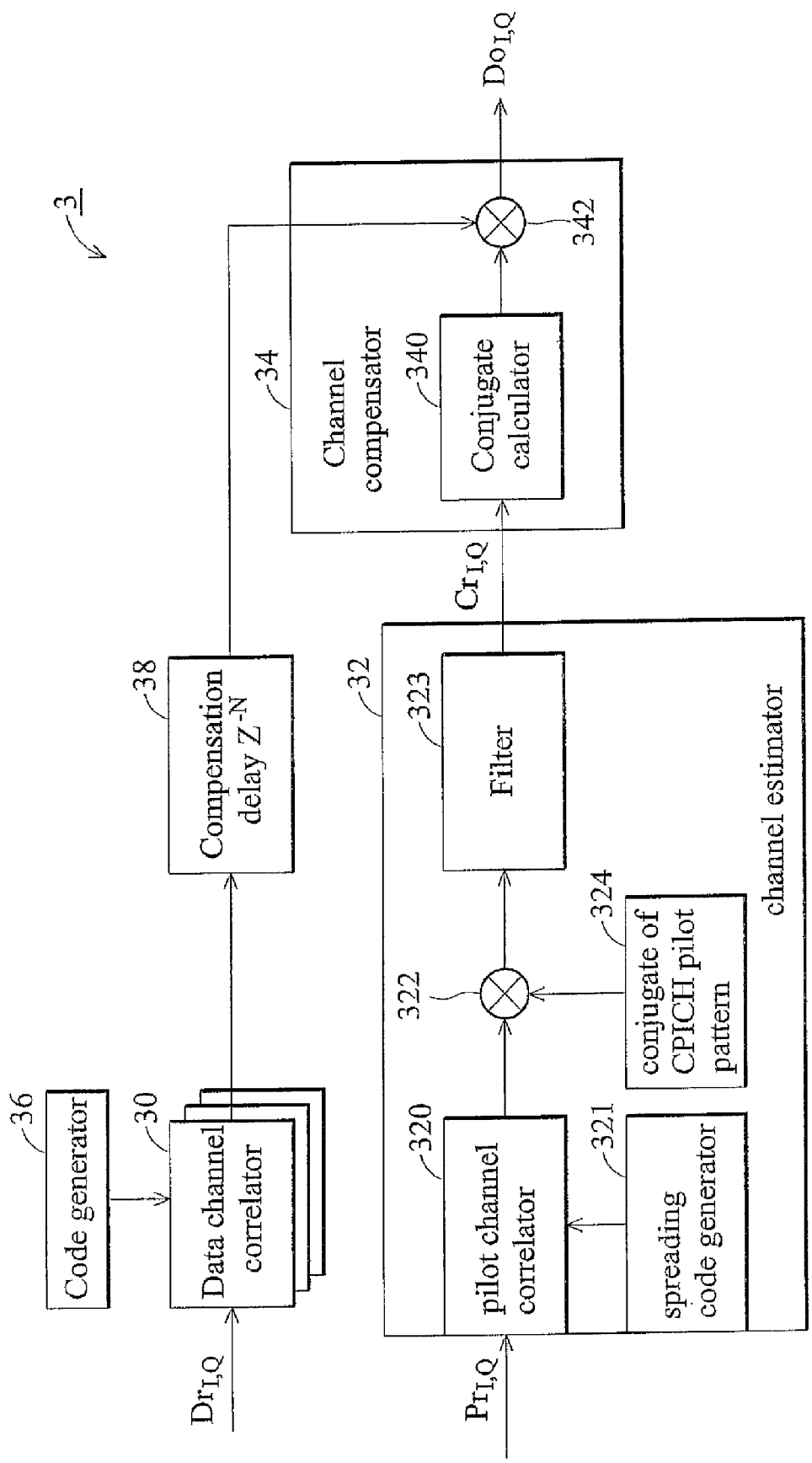
FIG. 3 is a block diagram of an exemplary spread spectrum receiver in the invention.

FIG. 3 is a block diagram of an exemplary spread spectrum receiver in the invention, comprising data channel correlator 30, channel estimator 32, channel compensator 34, code generator 36, and compensation delay 38. Code generator 36 is coupled to data channel correlator 30, compensation delay 38, in conjunction with channel estimator 32 couples to channel compensator 34. Channel estimator 32 comprises pilot channel correlator 320, spreading code generator 321, multiplier 322, filter 323, and conjugate pilot pattern generator 324. Pilot channel correlator 320 is coupled to spreading code generator 321 and multiplier 322.

Data channel correlator 30 despreads and/or descrambles a data channel with an appropriate spreading and/or descrambling code generated by code generator 36. In an embodiment, the spread spectrum receiver is a WCDMA receiver, and each data channel correlator 30 despreads and/or descrambles spread spectrum data $Dr_{I,Q}$ in a downlink physical channel (DPCH) with a difference spreading code generated by code generator 36. Spread spectrum data $Dr_{I,Q}$ may comprise In-phase and Quadrature components to be carried in each DPCH. The spreading factors may range from 4 to 256 or above depending on transmission data bit-rate. DPCH may be Downlink Physical Data Channels (DPDCH), or Downlink Physical Control Channel (DPCCH).

Figure 4:
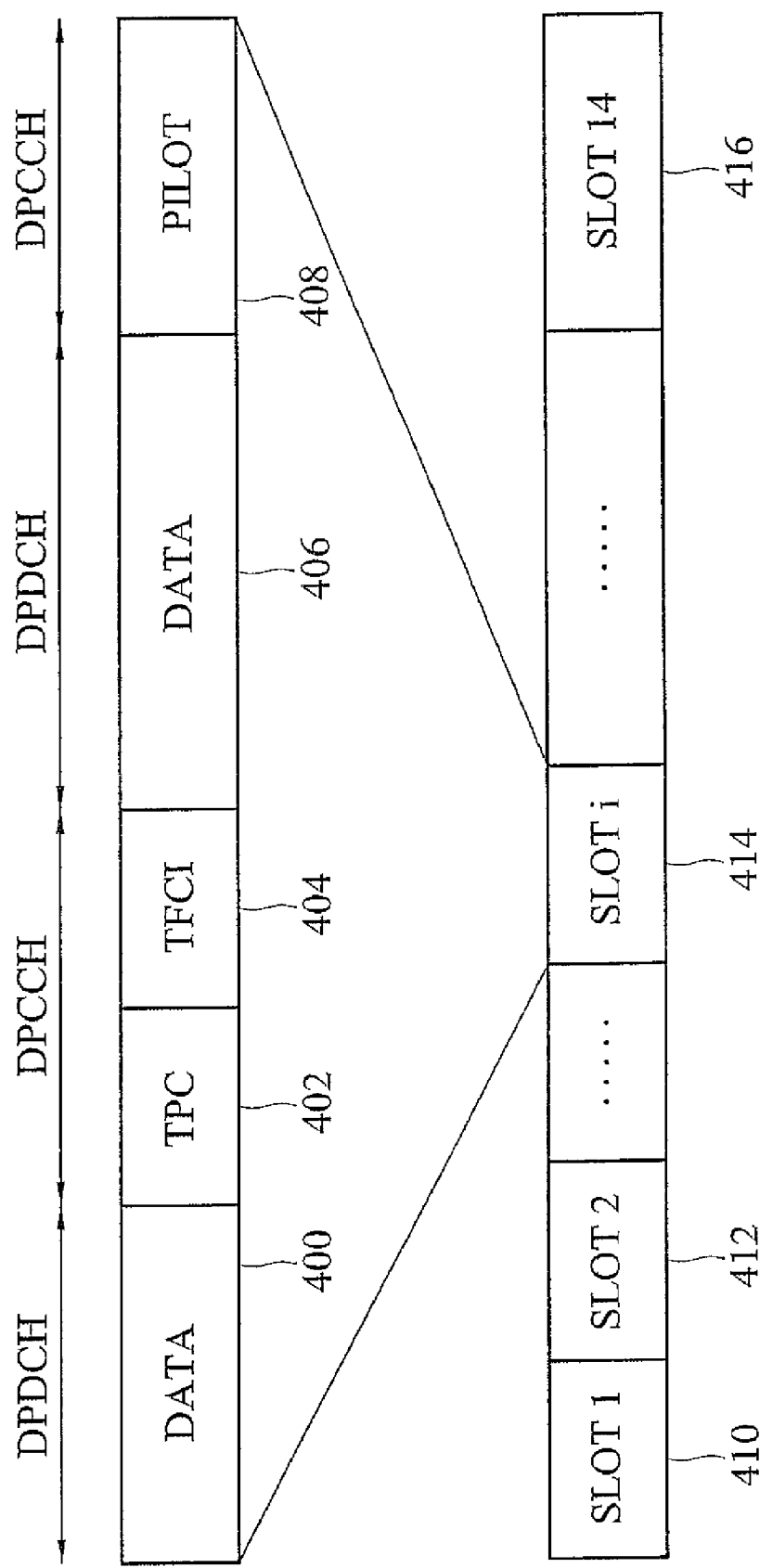
FIG. 4 shows an exemplary WCDMA data format.

FIG. 4 shows an exemplary WCDMA data format, comprising DPDCH data channels 400 and 406, and DPCCH control channels 402, 404, and 408. In a WCDMA downlink physical channel (DPDCH/DPCCH), pilot symbols (2 to 8 symbols) and control symbols are transmitted in every slot. There are 15 slots per WCDMA frame, and each frame is 10 ms long and has 38400 chips (3.84M cps). Different data rate may be achieved by different spreading factors. In WCDMA systems, the spreading factor ranges between 4 to 256, corresponding to 960 kbps to 15 kbps data rate.

Referring back to FIG. 3, pilot channel correlator 320 in channel estimator 32 despreads and/or descrambles a pilot channel with an appropriate spreading code, while data channel correlator 30 despreads and/or descrambles data $Dr_{I,Q}$ concurrently. In an embodiment, spread spectrum receiver in a WCDMA receiver, each pilot channel correlator 32 despreads and/or descrambles spread spectrum pilot $Pr_{I,Q}$ in a Common Pilot Channel (CPICH) with a fixed spreading code and spreading factor 256. The spreading factors may be fixed at 256. Pilot channel correlator 320 despreads and/or descrambles pilot by the fixed spreading code and spreading factor of 256, thereby generating despread pilot symbols Then the multiplier 322 multiplies the despread pilots and gets the channel estimates $Cr_{I,Q}$. Filter 323 filters noise and interference off channel estimate to produce filtered channel estimate with group delay $D_g$ to channel compensator 34. Filter 323 may be an infinite impulse filter (IIR).

Compensation delay 38 receives and delays correlated data $Dr_{I,Q}$ for period N corresponding to group delay $D_g$ arising from filter 323, such that delayed data $Dr_{I,Q}$ and filtered channel estimate $Cr_{I,Q}$ are concurrent upon arrival at channel compensator 14. Period N is determined as follows:

$$N = \frac{D_g \times SF_{pilot}}{SF_{data}} \quad (F1)$$

where
N is the period;
$D_g$ is group delay $D_g$ corresponding to the filter;
$SF_{pilot}$ is a spreading factor of the pilot; and
$SF_{data}$ is a spreading factor of the data.

Channel compensator 34 comprises conjugate calculator 340 and multiplier 342. Conjugate calculator 340 receives and calculates a conjugate of filtered channel estimate $Cr_{I,Q}$, and multiplier 342 multiplies delayed data $Dr_{I,Q}$ by the conjugate of filtered channel estimate $Cr_{I,Q}$ to output compensated output data $Do_{I,Q}$. Since delayed data $Dr_{I,Q}$ and filtered channel estimate $Cr_{I,Q}$ are concurrent, channel compensator 34 performs channel compensation on data $Dr_{I,Q}$ at accurate timing, leading to an accurate compensation result $Do_{I,Q}$.

Figure 5:
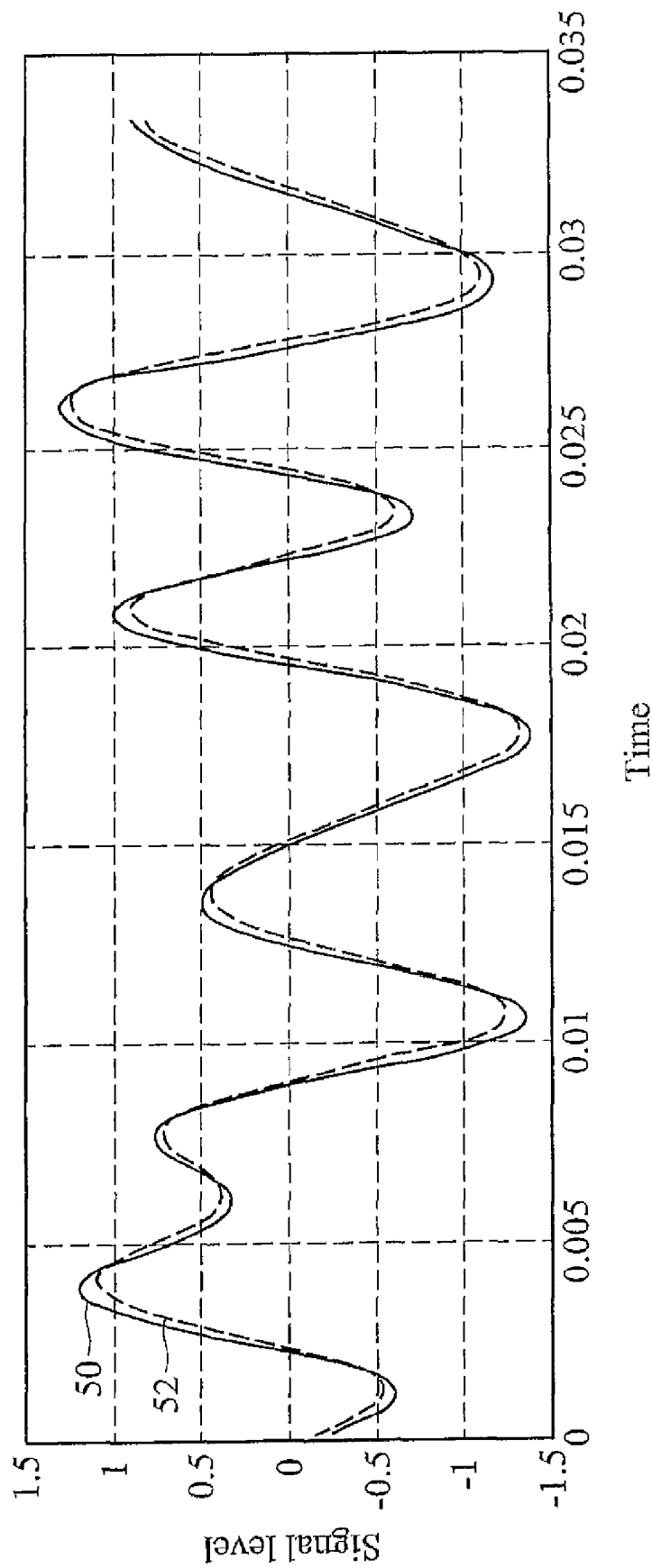
FIG. 5 channel signal level against time incorporating the spread spectrum receiver in FIG. 3.

FIG. 5 plots signal level against time incorporating the spread spectrum receiver in FIG. 3, comprising the real channel 50 multiplied on delayed data and filtered channel estimate 52. Channel estimate $Cr_{I,Q}$ passes filter 323 to remove undesired noise and interference, generating filtered channel estimate 52. Referring to FIG. 5, the real channel 50 multiplied on delayed data is synchronous with filtered channel estimate 52, thus channel compensator 34 is able to perform channel compensation to delay data with filtered channel estimate 52 at accurate timing, resulting in accurate channel compensation.

Figure 6:
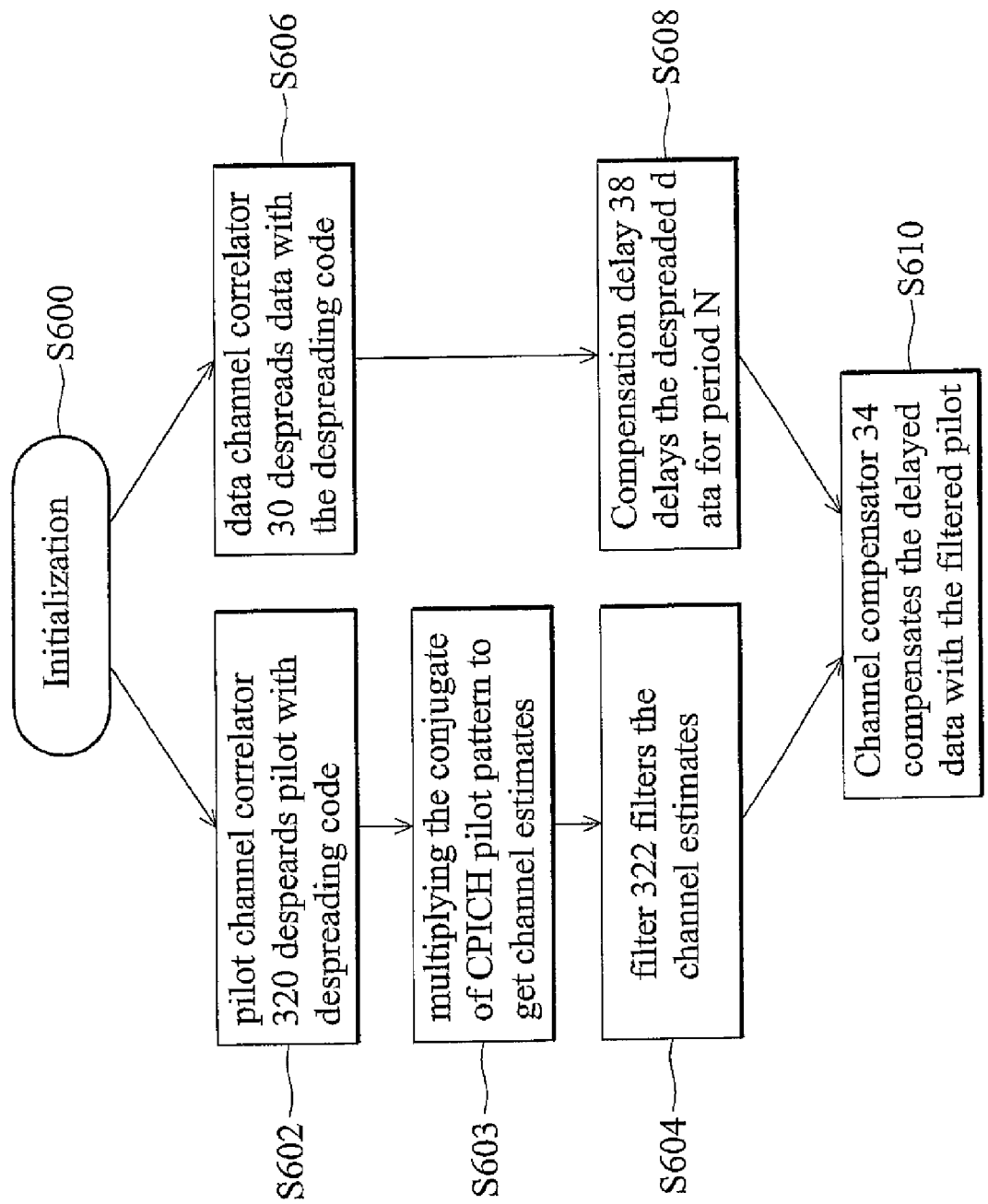
FIG. 6 is a flowchart of a channel compensation method according to the invention, incorporating the spread spectrum receiver in FIG. 3.

FIG. 6 is a flowchart of a channel compensation method according to the invention, incorporating the spread spectrum receiver in FIG. 3.

Upon initialization, spread spectrum receiver 3 receives pilot $Pr_{I, Q}$ from CPICH and data $Dr_{I, Q}$ from several DPCH simultaneously.

In step S602, pilot channel correlator 320 despreads pilot $Pr_{I, Q}$ with a known spreading code, the spreading factor is fixed at 256. And in step S603, a multiplier multiplies the despread pilots with conjugate of CPICH pilot pattern to generate channel estimate $Cr_{I, Q}$. In step S604, filter 323 receives and filters channel estimate $Cr_{I, Q}$ to remove undesired noise and interface, resulting in filtered channel estimate $Cr_{I, Q}$ with group delay $D_g$ to channel compensator 36.

Step S606 operates parallel to step S602, with data channel correlator 30 despreads data $Dr_{I, Q}$ with a spreading code generated by code generator 36. The spreading factor may range from 4 to 256 for WCDMA systems. Next, in step S608, compensation delay 38 delays despreaded data $Dr_{I, Q}$ for period N corresponding to the group delay $D_g$ due to filter 323, such that both despreaded data $Dr_{I, Q}$ and filtered channel estimate $Cr_{I, Q}$ are delayed by group delay $D_g$ when arriving at channel compensator 34. Period N may be determined by F1.

In step S610, channel compensator 34 compensates the delayed data $Dr_{I, Q}$ with filtered channel estimate $Cr_{I, Q}$ by calculating the conjugate of filtered channel estimate $Cr_{I, Q}$, then multiplying the delayed data $Dr_{I, Q}$ by the conjugate. Since now both delayed data $Dr_{I, Q}$ and filtered channel estimate $Cr_{I, Q}$ are delayed by identical period N, channel compensator 32 produces an accurately compensated output data $Do_{I, Q}$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A channel compensation method for uses in a spread spectrum receiver for receiving a pilot channel and a data channel, comprising:
   despreading pilots from the pilot channel;
   multiplying despread pilots with conjugate of pilot pattern to provide channel estimates;
   filtering the channel estimates;
   despreading data in the data channel;
   delaying the despread data for a period corresponding to the filtering, wherein the period is proportional to a ratio of spreading factors of the pilot channel to the data channel; and
   compensating the delayed data with the filtered channel estimates.

2. The channel compensation method of claim 1, wherein the despreading the pilots comprises correlating the pilots with scrambling code.

3. The channel compensation method of claim 1, wherein the period is:

$$N = \frac{D_g \times SF_{pilot}}{SF_{data}}$$

where
   N is the period;
   $D_g$ is a group delay corresponding to the filtering;
   $SF_{pilot}$ is a spreading factor of the pilot; and
   $SF_{data}$ is a spreading factor of the data.

4. The channel compensation method of claim 1, wherein the filtering step comprising infinite impulse response filtering.

5. The channel compensation method of claim 1, wherein the compensating step comprises: obtaining a conjugate of the filtered channel estimates; and multiplying the delayed data by the conjugate of the filtered channel estimates.

6. The channel compensation method of claim 1, wherein the period is proportional to the filtering.

7. The channel compensation method of claim 1, wherein the period is proportional to the group delay corresponding to the filtering.

8. A spread spectrum receiver in a communication system compensating channel response, comprising:
   a multiplier for multiplying despread pilots with conjugate of pilot pattern to provide channel estimates;
   a filter for filtering the channel estimates from the multiplier;
   a data channel correlator for despreading data symbols in a data channel;
   a delay module, coupled to the data channel correlator, for delaying the despread data symbols for a period, wherein the period is proportional to a ratio of spreading factors of the pilot channel to the data channel; and
   a channel compensator, coupled to the filter and the delay module, for compensating the delayed despread data symbols with the filtered channel estimates.

9. The spread spectrum receiver of claim 8, wherein the despread pilots is correlated the received pilots with scrambling code.

10. The spread spectrum receiver of claim 8, wherein the period is:

$$N = \frac{D_g \times SF_{pilot}}{SF_{data}}$$

where
   N is the period;
   $D_g$ is a group delay corresponding to the filtering;
   $SF_{pilot}$ is a spreading factor of the pilot; and
   $SF_{data}$ is a spreading factor of the data.

11. The spread spectrum receiver of claim 8, wherein the filter is an infinite impulse response filter.

12. The spread spectrum receiver of claim 8, wherein the channel compensator being configured to estimates a conjugate of the filtered channel estimates and to multiplies the delayed data by the conjugate of the filtered channel estimates.

13. The spread spectrum receiver of claim 8, wherein the period is proportional to the filter.

14. The spread spectrum receiver of claim 8, wherein the period is proportional to the group delay corresponding to the filter.

* * * * *